US011100040B2

United States Patent
Byers et al.

(10) Patent No.: US 11,100,040 B2
(45) Date of Patent: Aug. 24, 2021

(54) MODULAR REMOTE DIRECT MEMORY ACCESS INTERFACES

(71) Applicant: CISCO TECHNOLOGY, INC., San Jose, CA (US)

(72) Inventors: Charles Calvin Byers, Wheaton, IL (US); M. David Hanes, Lewisville, NC (US); Joseph Michael Clarke, Cary, NC (US); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 23 days.

(21) Appl. No.: 16/162,827

(22) Filed: Oct. 17, 2018

(65) Prior Publication Data

US 2020/0125529 A1  Apr. 23, 2020

(51) Int. Cl.
| | |
|---|---|
| *G06F 15/16* | (2006.01) |
| *G06F 15/173* | (2006.01) |
| *G06F 15/78* | (2006.01) |
| *G06F 3/06* | (2006.01) |
| *H04L 29/08* | (2006.01) |

(52) U.S. Cl.
CPC ........ *G06F 15/17331* (2013.01); *G06F 3/067* (2013.01); *G06F 15/78* (2013.01); *H04L 67/1097* (2013.01)

(58) Field of Classification Search
CPC ............................................... G06F 15/17331
USPC ................ 709/217–219, 212, 221; 710/8, 62
See application file for complete search history.

(56) References Cited

U.S. PATENT DOCUMENTS

| | | | |
|---|---|---|---|
| 7,047,374 B2 | 5/2006 | Sah et al. | |
| 7,757,033 B1 | 7/2010 | Mehrotra et al. | |
| 9,974,176 B2 | 5/2018 | Byers | |
| 10,303,396 B1* | 5/2019 | Harvey | .................. G06F 3/061 |
| 2003/0126376 A1 | 7/2003 | Blankenship et al. | |
| 2011/0082965 A1 | 4/2011 | Koka et al. | |
| 2015/0095443 A1* | 4/2015 | Yang | .................. G06F 9/45558 709/212 |
| 2015/0222547 A1* | 8/2015 | Hayut | ..................... H04L 49/00 709/223 |
| 2016/0248690 A1* | 8/2016 | Banavalikar | ............. H04L 43/08 |
| 2017/0010628 A1* | 1/2017 | Byers | ....................... H05K 1/14 |
| 2017/0046291 A1* | 2/2017 | Borkenhagen | ........ G06F 13/387 |
| 2019/0104029 A1* | 4/2019 | Guim Bernat | ...... H04L 41/0896 |
| 2020/0034200 A1* | 1/2020 | Calciu | ................. G06F 12/0891 |

OTHER PUBLICATIONS

"ConnectX-5 VPI Socket Direct", Mellanox Technologies, 2018.
Zhu et al., "Congestion Control for Large-Scale RDMA Deployments", ACM, 2015.

* cited by examiner

*Primary Examiner* — Ilwoo Park
(74) *Attorney, Agent, or Firm* — Cindy Kaplan

(57) ABSTRACT

In one embodiment, an apparatus includes a multi-socket motherboard, a processor connected to a first socket on the multi-socket motherboard, and an RDMA (Remote Direct Memory Access) interface module connected to a second socket on the multi-socket motherboard and in communication with the processor over a coherency interface. The RDMA interface module provides an inter-server interface between servers in an RDMA domain. A method for transferring data between servers with RDMA interface modules is also disclosed herein.

20 Claims, 5 Drawing Sheets ated and underlying infrastructure to be abstracted for applications and network services. SDN uses cloud, fog, and router-based servers, which need an agile mix of processing, storage, and networking resources. The networking needs to be high performance, especially for low latency IoT (Internet of Things) applications or high bandwidth streaming for video analytics, for example.

MODULAR REMOTE DIRECT MEMORY ACCESS INTERFACES

TECHNICAL FIELD

The present disclosure relates generally to network devices, and more particularly, to modular interfaces on multi-socket servers.

BACKGROUND

SDN (Software Defined Networking) decouples network control and forwarding functions thereby enabling the network control to become directly programmable and underlying infrastructure to be abstracted for applications and network services. SDN uses cloud, fog, and router-based servers, which need an agile mix of processing, storage, and networking resources. The networking needs to be high performance, especially for low latency IoT (Internet of Things) applications or high bandwidth streaming for video analytics, for example.

RDMA (Remote Direct Memory Access) provides direct memory access from memory of one computer into another computer without significantly loading either computer's operating system. RDMA improves throughput and performance by freeing up resources and facilitates faster data transfer and low-latency networking. Networks supporting SDN management and decoupling along with RDMA, without conventional bandwidth and configuration limitations would be valuable.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
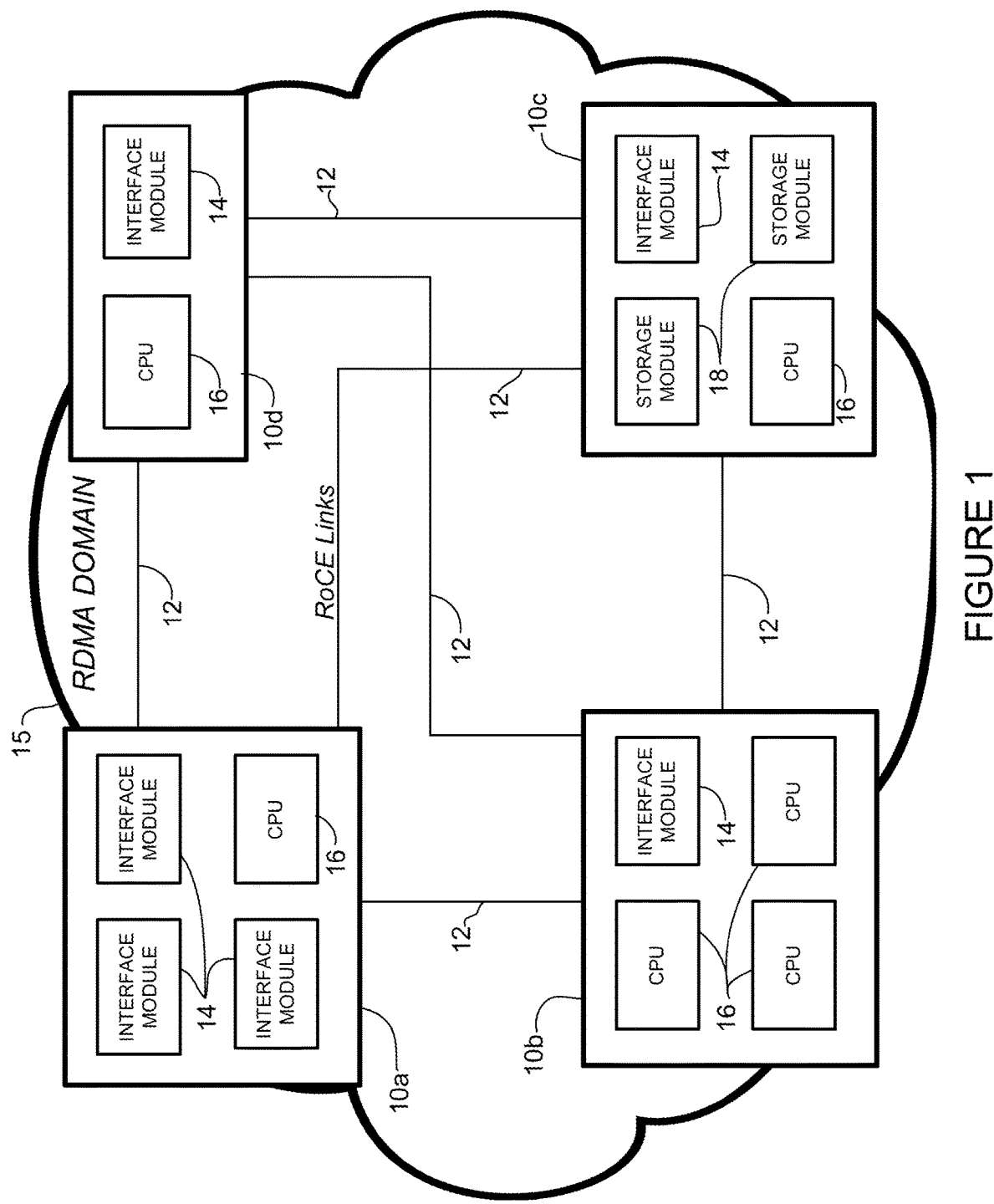
FIG. 1 illustrates a plurality of multi-socket servers in communication over RoCE links in an RDMA domain, in accordance with one embodiment.

In one embodiment, an apparatus generally comprises a multi-socket motherboard, a processor connected to a first socket on the multi-socket motherboard, and an RDMA (Remote Direct Memory Access) interface module connected to a second socket on the multi-socket motherboard and in communication with the processor over a coherency interface. The RDMA interface module provides an inter-server interface between servers in an RDMA domain.

In one or more embodiments, the inter-server interface comprises an RoCE (RDMA over Converged Ethernet) interface. A storage module may be connected to a third socket of the multi-socket motherboard and comprise a plurality of nonvolatile memory cards providing mass storage to the apparatus. The sockets may be configured such that the processor and the RDMA interface module may be exchanged between the sockets.

In another embodiment, a server generally comprises a multi-socket motherboard, a processor connected to a first socket on the multi-socket motherboard, an RDMA interface module connected to a second socket on the multi-socket motherboard and in communication with the processor over a coherency interface, and a plurality of optical modules in communication with the RDMA interface module to provide interfaces for communication with a plurality of severs in an RDMA domain with the server.

In yet another embodiment, a method generally comprises receiving data at an RDMA interface module on a multi-socket motherboard over a coherency interface and transmitting the data from the RDMA interface module on an RDMA link to a server in an RDMA domain. The multi-socket motherboard comprises at least one processor connected to a socket and in communication with the RDMA interface module over the coherency interface.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

RDMA (Remote Direct Memory Access) allows computers to exchange data without involving the operating system and may be used to move data between servers and from servers to storage. The RDMA concept has been adopted by the Ethernet community with the implementation of RoCE (RDMA over Converged Ethernet), which allows remote direct memory access over an Ethernet network. RDMA and RoCE (e.g., RoCEv2 (version 2)) networking is valuable for use in SDN (Software Defined Networking), IoT (Internet of Things) and AWL (Artificial Intelligence/Machine Learning). For example, many RoCEv2 host adapters are hardware accelerated, where field programmability to adapt to SDN workloads would be valuable. However, use of conventional servers with RoCE may result in bandwidth and configuration limitations. For example, conventional multi-socket servers often suffer bandwidth bottlenecks, lack of coherency, and slot limits on their PCIe (Peripheral Component Interconnect Express) I/O (Input/Output) buses and are thus not well suited for these applications. Even if inter-socket bandwidth (e.g., between processors and storage modules on a server) was sufficiently high, providing that bandwidth off of a server is difficult.

In one example, multi-socket servers may comprise sockets interconnected over a fast set of inter-chip coherency buses (e.g., UPI (UltraPath Interconnect) links in a mesh between chips to provide coherent paths). Conventional interfaces for ports onto clusters of servers are typically via PCIe buses, which operate at a fraction of the throughput of UPI, are inefficient due to the need for multiple hops, and are not typically coherent. Thus, RoCEv2 interfaces on PCIe channels may not have sufficient bandwidth to match the inter-chip interfaces, especially if memory that RDMA targets and PCIe interfaces are on different sockets.

The embodiments described herein provide for the configuration of multi-socket SDN servers with a custom mix of processing, storage, and programmable I/O ports (e.g., RoCEv2 ports), while overcoming bandwidth and configuration limitations of conventional I/O structures. In one or more embodiments, an RDMA interface module is compatible with processor sockets of a multi-socket server and provides a plurality of fast RoCEv2 links to interconnect with other servers. As described in detail below, the interface module has access to other server sockets over inter-chip coherency buses, thereby providing very high bandwidth and low latency. One or more embodiments may also allow the functions of a multi-socket server to be custom configured using interface modules described herein along with server processor chips and high performance storage engines.

The embodiments operate in the context of a data communications network including multiple network devices. The network may include any number of network devices in communication via any number of nodes (e.g., routers, switches, gateways, controllers, edge devices, access devices, aggregation devices, core nodes, intermediate nodes, fog nodes, or other network devices), which facilitate passage of data over one or more networks. One or more of the network devices may comprise a multi-socket network device (e.g., multi-socket SDN server) comprising one or more RDMA interface modules described herein.

The network device is a programmable machine that may be implemented in hardware, software, or any combination thereof. The network device may include one or more processor, memory, and network interface. Memory may be a volatile memory or non-volatile storage, which stores various applications, operating systems, modules, and data for execution and use by the processor. Logic may be encoded in one or more tangible media for execution by the processor. For example, the processor may execute codes stored in a computer-readable medium such as memory. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. As described below, the network device may comprise, for example, an SDN server and may include any number of memory, processor, or interface components. It is to be understood that the network devices described herein are only examples and that the embodiments described herein may be implemented on different configurations of network devices. For example, a server may further include any suitable combination of hardware, software, algorithms, processors, devices, components, or elements.

In one or more embodiments, the server comprises a multi-socket motherboard, a processor connected to a first socket on the multi-socket motherboard, and an RDMA (Remote Direct Memory Access) interface module connected to a second socket on the multi-socket motherboard and in communication with the processor over a coherency interface. As described in detail below, the RDMA interface module provides an inter-server interface between servers in an RDMA domain.

Referring now to the drawings, and first to FIG. 1, a plurality of network devices (e.g., multi-socket SDN servers) 10a, 10b, 10c, 10d in communication with one another over links 12 in an RDMA domain 15 is shown. In this example, each server 10a, 10b, 10c, 10d includes at least one interface module 14 (also referred to herein as an RDMA interface module, RoCE module, or inter-server interface module) to provide fast links 12 to interconnect with other servers. In one example, data is transferred between the servers over optical or electrical Ethernet links 12 using RoCE (e.g., RoCEv2 or other suitable version including later developed versions). In another example data is transferred over communications links 12 using InfiniBand. As described below, the interface module 14 may be intermixed with processors (CPUs (Central Processing Units)) 16 and storage modules 18 on a multi-socket server motherboard functioning as a very high speed RDMA Host Channel Adapter (HCA) for networks such as RoCE or Infiniband networks. The interface module 14 has access to other sockets on the same server over inter-socket coherency interfaces to provide high bandwidth and low latency. In one or more embodiments, the interface module 14 generally conforms to the physical size (footprint, component height) and connection interface of the processor module (CPU) 16 and is therefore compatible (e.g., pin compatible) with processor sockets of the multi-socket server.

Functions of the multi-socket servers 10a, 10b, 10c, 10d may be custom configured using any number or arrangement of RDMA interface modules 14, processors (CPUs) 16, or storage modules 18. The processor 16 may comprise a standard server processor chip, such as a 130 watt server class CPU with 24+ cores per chip, Graphics Processing Unit, Tensor Processing Unit, or any other suitable processor. In one or more embodiments, the storage module 18 may comprise a plurality of nonvolatile memory cards as described in U.S. Pat. No. 9,974,176, issued May 15, 2018. For example, the storage module 18 may comprise a large array of storage chips that extend upward vertically from a horizontal storage substrate and are located where the heatsink would be located for the CPU chip 16.

In the example shown in FIG. 1, server 10a is a four socket (quad-socket) server configured with three RDMA interface modules 14 and one processor (CPU) 16 to provide an RoCEv2 router (e.g., 30 port switch/router) operable to transfer 3 Tb/s of data, for example. Under certain loads, only two of the interface modules 14 may be needed to push RoCE operations. In this case, the third interface module 14 may be reconfigured to handle offloading of tasks such as the processing of big data sets or running network analytics. Server 10b is a four socket server comprising one interface module 14 and three processors 16 to provide a modular supercomputer configured for computationally intensive applications. If, for example, eleven of these boards are interconnected in a full mesh system, a 33 socket supercomputer cluster is created with an RDMA interconnect and inter-chip and inter-motherboard hardware based coherency. Server 10c is a four socket server configured for storage intensive applications and comprises one interface module 14, one processor 16, and two storage modules 18. In one example, the server 10c provides a 64 TB highly parallel flash memory storage engine with high performance RoCEv2 storage interconnect to up to ten host servers. Server 10d is a dual-socket server with a more balanced configuration and comprises one interface module 14 and one CPU chip 16.

It is to be understood that the servers 10a, 10b, 10c, 10d and arrangement shown in FIG. 1 is only an example and any number of servers may be in communication over any number of links 12 and each server may comprise any number of sockets and any number or configuration of RDMA interface modules 14, processors 16, or storage modules 18. For example, the servers may be configured with any mix of socket compatible high performance processing, high performance storage, and high performance interfaces in any combination onto a multi-socket server motherboard (described below with respect to FIG. 2). These configurations can be modified in the field using a simple process of replacing socket-based modules. The RDMA interface modules 14 described herein may be used, for example, in any high performance application of multiple CPU chips 16 where it is desired to efficiently share data between sockets across multiple motherboards. The server may be configured with the exact mix of interface modules 14, processors 16, and storage modules 18 needed to support one or more applications, thereby allowing the construction of arbitrarily complex networks of servers in the same RDMA domain 15 and potentially across wide geographies. The RDMA domain 15 may span any number of servers and even multiple data centers, or any complex network of servers in the same RDMA domain.

For servers having motherboards with multiple sockets (e.g., two, four, eight or any other number), interface modules 14, processors 16, and storage modules 18 may be distributed among the sockets to meet the data transfer (networking), processing, and storage needs of any particular server. Since the interface modules 14, processors 16, and storage modules 18 are configured to fit the same socket as the CPU chips 16, a multi-socket motherboard may provide flexible networking, processing, and storage options, depending on the application for which the server is being utilized. For example, a dual or quad-socket server may be modified by removing one or more CPU chips (processors) 16 and replacing them with the interface module 14 or storage module 18, which has the same form factor as the CPU chip plus its heatsink. The RDMA interface module 14 may dissipate an amount of heat that is a fraction of the heat dissipated by the high power multi-core processor 16 that the motherboard may be designed to carry. Accordingly, cooling of the interface module 14 may be achieved without a heatsink and the combination of the interface module 14 and optical modules (described below with respect to FIG. 4) may be arranged to occupy a similar space as the CPU chip and heatsink, which would otherwise occupy the CPU sockets of the motherboard.

Figure 2:
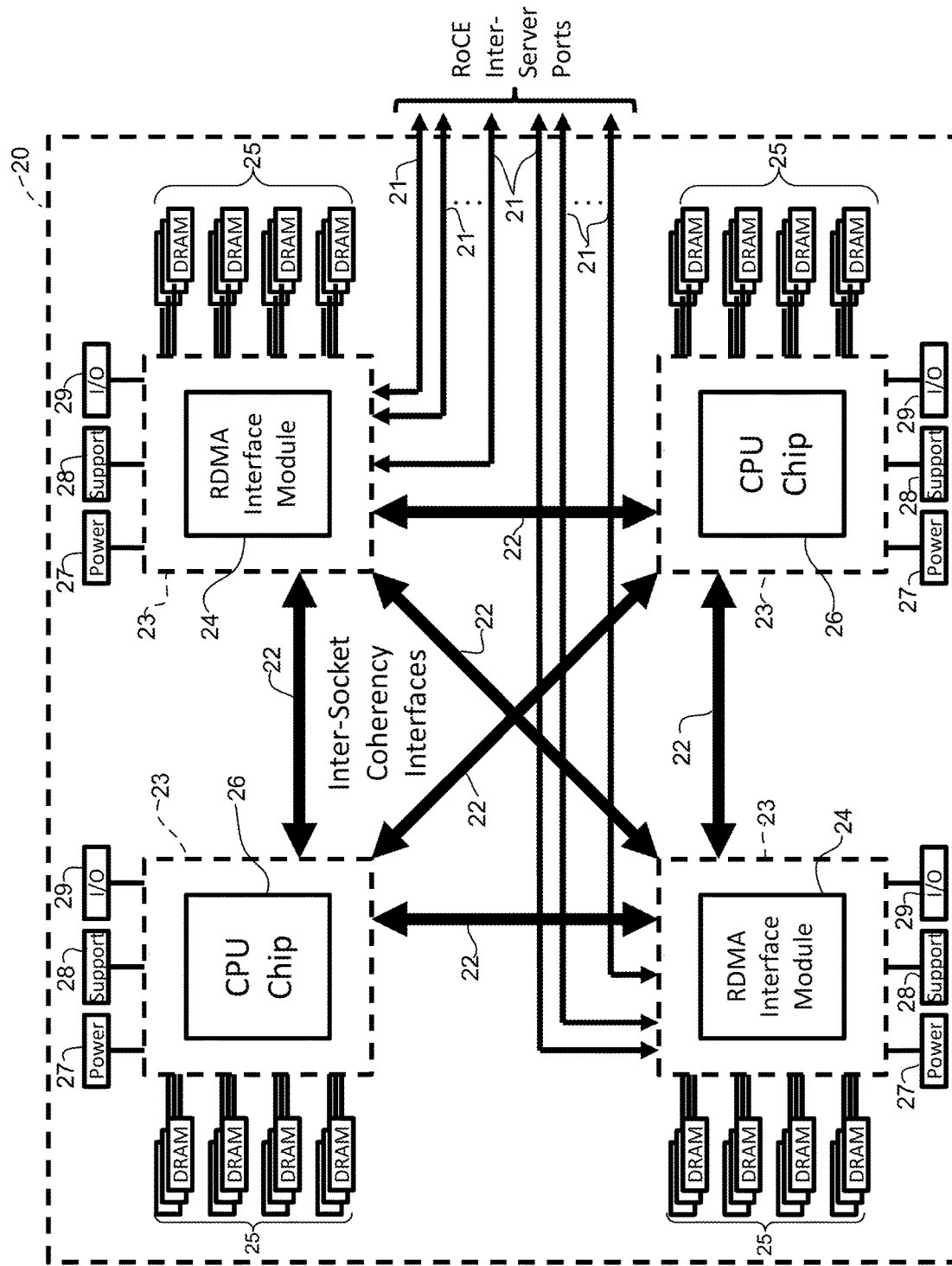
FIG. 2 illustrates a multi-socket server, in accordance with one embodiment.

FIG. 2 illustrates an example of a multi-socket motherboard 20 configured to provide high speed remote direct memory access, in accordance with one embodiment. In the example shown in FIG. 2, the server motherboard 20 comprises four sockets 23 (first, second, third, and fourth sockets) with RDMA interface modules 24 (e.g., RoCEv2 modules) connected to (mounted on, arranged within) two of the sockets 23 and processors (CPU chips) 26 connected to the other two sockets. The sockets 23 may be referred to as CPU sockets since they are configured to receive standard CPU chips. The interface modules 24 are compatible (e.g., pin, power, mechanical footprint) with the CPU sockets 23. The sockets 23 serving the interface modules 24 and CPU chips 26 have access to their motherboard resources, including, for example, memory channels 25 for routing tables, buffers, and the like, power subsystem 27 operable to power the interface module 24 or CPU chip 26, support infrastructure 28 that provides support functions such as timing and management functions, and I/O (Input/Output) interfaces 29 (e.g., PCIe bus interfaces). The multichannel memory subsystem 25 may comprise, for example, any number of DRAM (Dynamic Random-Access Memory) channels and DIMM (Dual In-line Memory Module) arrays. The interface modules 24 may be configured to utilize the same memory subsystems 25, power subsystems 27, support infrastructure 28, and I/O structures 29 as the CPU chips 26, thereby making them socket compatible.

In one or more embodiments, the sockets 23 are interconnected by a set of inter-socket coherency interfaces 22. The coherency interfaces 22 may be embodied as a wide, fast, low latency, coherent inter-chip bus. As shown in the example of FIG. 2, the coherency interfaces 22 form a full mesh between the four sockets 23, permitting any of the sockets to access any other of the sockets in a single network hop with low latency and high bandwidth. The coherency interfaces 22 may comprise, for example, QPI (QuickPath Interconnect), UPI (UltraPath Interconnect), NVLink™, HyperTransport™, or other suitable interconnect. The inter-socket coherency interfaces 22 interconnect sockets 23 (e.g., traditional CPU sockets) together on the multi-socket motherboard 20 in a very high speed, coherent inter-chip network for data transfer between the RDMA modules 24 and CPU chips 26 (or storage modules if located on one or more of the sockets). The inter-socket coherency interfaces 22 are connected to the RoCE inter-server ports 21 through the interface modules 24. It should be noted that while the example shown in FIG. 2 and described herein refers to the interface modules 14 configured for use with RoCE ports, other protocols such as InfiniBand may be used, without departing from the scope of the embodiments.

In the example shown in FIG. 2, the motherboard 20 comprises a quad-socket server motherboard (or blade server board) that may be in communication with any number of other servers via interfaces 21. For example, there may be five to ten high speed fiber interfaces (e.g., CFP4 (C-Form Factor Pluggable 4), SFP+ (Small Form Factor Pluggable Plus), or any other pluggable transceiver modules) that run the RoCEv2 protocol stack and are intimately tied to coherent inter-socket buses 22 on the multi-socket server motherboard 20 via the interface modules 24. In one example, about ten fiber or copper interfaces may fit within the location that the CPU heatsink would traditionally fit within the server, and RoCE acceleration hardware and a highly capable router function may be put on a chip (e.g., ASIC (Application Specific Integrated Circuit)) between pluggable optical modules on top and the standard socket 23 below (described further below with respect to FIG. 4). As previously described, these functions fit within the mechanical and power footprint of the CPU chip plus heatsink that the interface module 24 replaces within the socket 23. The interface cables 21 could route off the motherboard 20 and onto a connector panel on the server's enclosure. These channels may be routed, for example, via fiber or other high-speed L1 (Layer 1) media to a plate facing externally on the chassis.

Fiber cables may take the I/O off the socket mounted interface modules 24, out of the motherboard 20 and server chassis, and on to other network elements participating in the RDMA domain. The optical fibers exit the motherboard 20, interconnecting with other server motherboards in the RDMA domain. The fibers may be contained within the same cabinet or data center, or interconnect remote servers tens of kilometers apart (or any other distance).

As previously described with respect to FIG. 1, the motherboard 20 (FIG. 2) may comprise any number of sockets 23 with any configuration of RDMA interface modules 24, CPU chips, 26, or storage modules to meet specific requirements of a multi-socket server's application load. Furthermore, since the interface modules 24 are compatible with the CPU sockets 23, the interface modules 24 may be retrofit onto legacy multi-socket server motherboards.

Figure 3:
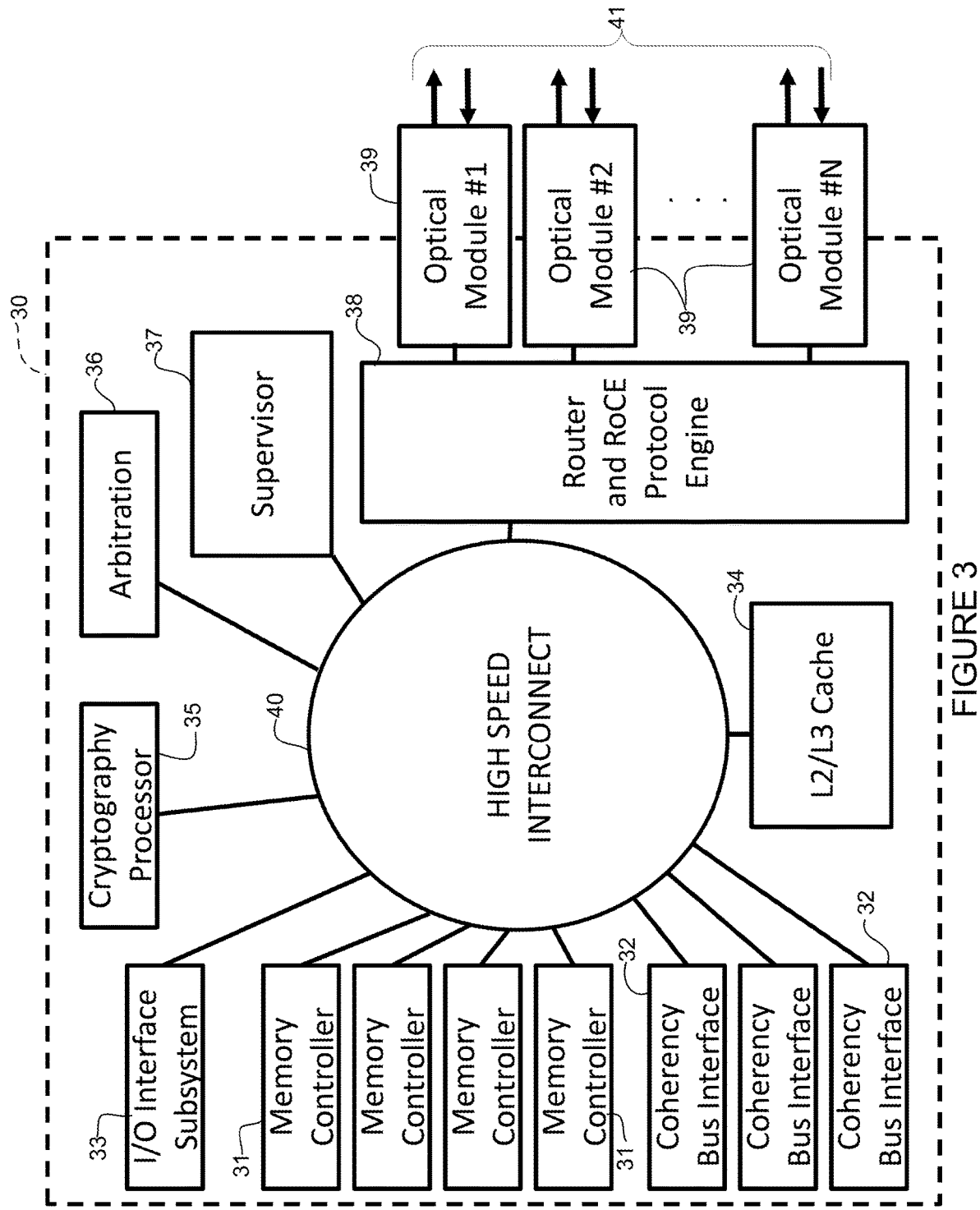
FIG. 3 illustrates a logical structure of an RDMA interface module of the multi-socket server of FIG. 2, in accordance with one embodiment.

FIG. 3 is a block diagram illustrating internal functions of an RDMA interface module 30, in accordance with one embodiment. The interface module 30 includes a plurality of standard interfaces for a server class socket. In the example shown in FIG. 3, the interfaces include memory controllers 31 (e.g., from two to six channels of high speed memory controllers), coherency bus interfaces 32, and I/O interface subsystem 33, supporting any number of PCIe lanes or other types of server I/O. In one example, the coherency bus interfaces 32 comprise three channels of UPI chip-to-chip buses, each with a throughput of 166 Gb/s, for an aggregate of approximately 500 Gb/s between each socket 23 and the motherboard 20 (FIGS. 2 and 3). It is to be understood that these interfaces are only an example and other interfaces (e.g., additional, fewer, similar or different throughput or other performance parameters) may be used without departing from the scope of the embodiments. In one example, these interfaces 31, 32, 33 may correspond to standard interfaces defined for conventional processors.

The interface module 30 may also include internal functions such as an L2/L3 (Layer 2/Layer 3) cache 34, cryptography processor 35, arbitration circuit 36, and supervisor circuit 37. These components may be similar to support elements found on CPU chips but may have extensions to support certain RoCE functions of the interface module 30. A high speed interconnect 40 allows all of the components of the interface module 30 to intercommunicate with high bandwidth and low latency.

As shown in the example of FIG. 3, the interface module 30 further comprises link and physical layer interfaces implementing RoCE (or other suitable protocol), which include a router and RoCE protocol engine 38 and optical modules (1 through N) 39. The router and RoCE protocol engine 38 may be integrated with optical module cages containing the optical modules 39 through an interposer, as described below with respect to FIG. 4. The router and RoCE protocol engine 38 manages traffic between the pluggable optical modules 39 and the core high speed interconnect 40 of the module 30. The optical modules 39 may comprise, for example, five 100 Gb/s CFP4 modules, ten 40 Gb/s CFP4 modules, or any other number or type of optical modules (e.g., SFP+ or multi-fiber silicon photonic devices). The configuration may be selected to match the mechanical footprint for a standard CPU chip plus heatsink, as previously described. For example, five CFP4 modules fit across the top of the interface module 30 with their fiber interfaces exiting parallel to the motherboard, with room for another five optical modules if double layer stacking is used (described below with respect to FIG. 4). In one example, each optical module 39 may have a power dissipation of about 6 watts and if ten optical modules are used there will still be 50-70 watts of power budget available on a socket designed for a 130 watt CPU chip to run the routing, protocol, cache, control, and motherboard interface functions of the interface module 30.

It is to be understood that the number, type, operating parameters, and arrangement of components of the interface module 30 shown in FIG. 3 and described above is only an example and changes may be made without departing from the scope of the embodiments. For example, future design optical modules may have different sizes or operating parameters, thus any number of optical modules may be used with the interface module 30. They may also use different types of interface physical layers, for example copper, or a mix of copper and optical.

Figure 4:
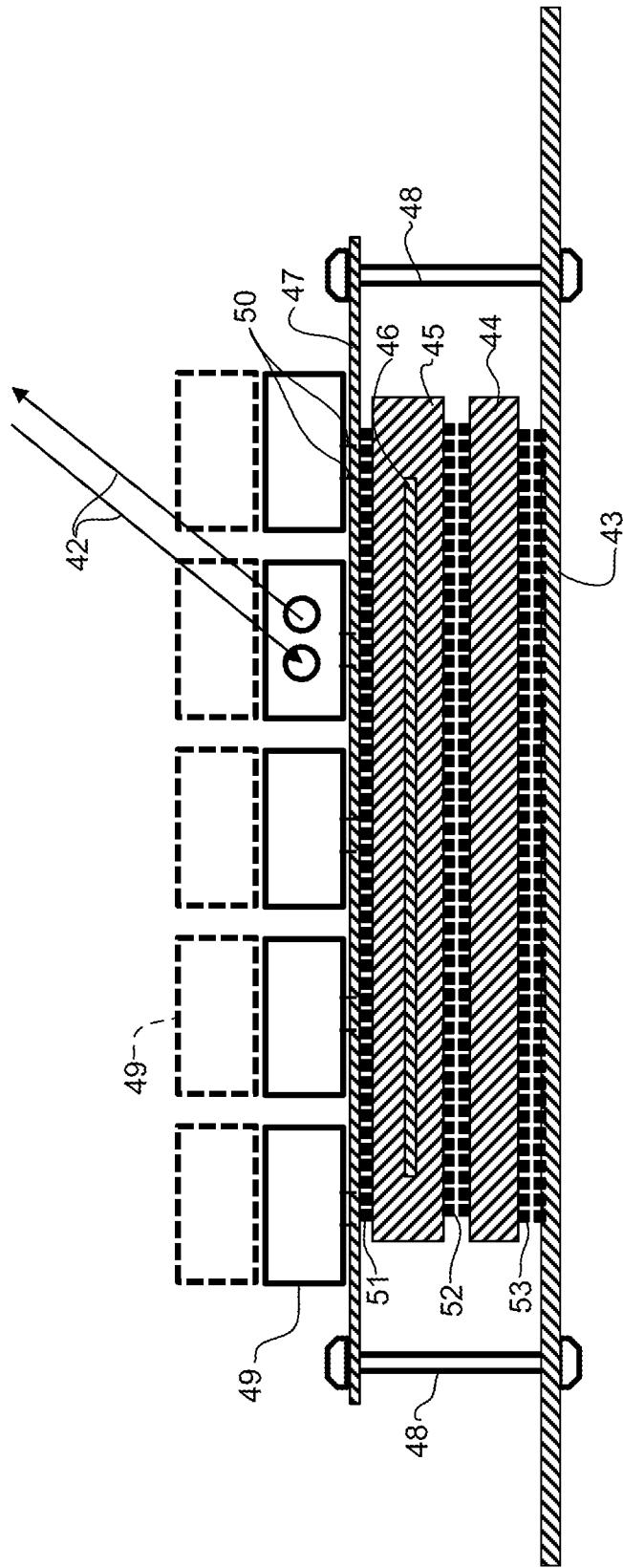
FIG. 4 illustrates a physical structure of the RDMA interface module connected to a socket, in accordance with one embodiment.

FIG. 4 illustrates the physical structure of an interface module mounted on a motherboard 43 at socket 44, in accordance with one embodiment. More specifically, FIG. 4 is a cross-sectional side view illustrating a mechanical design of one embodiment of the interface module mounted on the server motherboard 43. The multi-socket server motherboard/blade PCB (Printed Circuit Board) 43 provides power, control, and inter-chip interconnect (including high speed coherent chip-to-chip interfaces (e.g., UPI)). As previously described, a standard CPU socket 44 mounted on the motherboard 43 allows for configuration of various types of processors, memory modules, or interface modules. The interface module includes an interface module IC (integrated circuit) package 45 comprising a chip (e.g., ASIC, FPGA (Field Programmable Gate Array)) 46 implementing the module specific functions shown in FIG. 3 and described above. The ASIC/FPGA may be fully software-programmable, thus the RoCE package may be reconfigured for offloading other tasks as dictated by the workload if RoCE capabilities are not immediately needed. An interposer circuit board 47 or alternatively a set of TSVs (Through-Silicon Vias) interconnect the interface module chip 46 to an array of optical module cages 49 positioned above the chip. In the example shown in FIG. 4, screws 48 (e.g., heatsink mounting screws) attach the interposer 47 to the motherboard 43. The screws 48 may be positioned on the interposer 47 such that they engage with the same mounting points that would be used to screw a CPU heatsink to the motherboard 43. The top of the interposer 47 may be configured with connections 50 on its top surface to the optical module cages 49 and connections on its bottom surface that mate with an array of connection points (e.g., pins, pads) 51 on top of ASIC package 45. Electrical routing traces on interposer 47 may also connect to interface module chip 46. In one example, the ASIC package 45 is configured with pads 52 that interface with connection points in the socket 44 and the socket connects to the motherboard at connection points 53.

The package 45 and interface module chip 46 may be formed using through silicon via technologies to facilitate making connections in two directions (down to the motherboard 43, and up to interposer 47 or optical module cages 49). In order to connect to the socket 44, ASIC package 45 is configured to have the same footprint, pin-out, signal descriptions, and physical volume as the CPUs for which the socket 44 may have been designed.

As previously described, various configurations of optical modules (e.g., CFP4, SFP+, or other optical or copper interface modules) may be installed in the optical module cages 49. The optical modules may support a data rate, for example, of 10, 40, or 100 Gb/s per cage and different physical layer options of the RoCEv2 links, including single mode fiber, long reach fiber, multimode fiber, Wavelength Division Multiplexed fiber, and copper. The second layer of optical module cages 49 is optional because the entire UPI bandwidth of a socket may be about 500 Gb/s, which is consumed by five 100 G interfaces, but if some of the optical modules have a lower data rate, all of the links are not run at 100% occupancy, the UPI bandwidth is supplemented by PCIe interfaces also terminating on the socket, or a portion of the traffic enters one fiber interface and exists another without ever touching the motherboard interfaces, more optical module cages 49 may be activated (e.g., up to ten in one example, which may approximately correspond to the current mechanical size limit of a typical CPU chip plus heatsink footprint). Interfaces 42 (e.g., optical interfaces) are provided at each module (e.g., optical module). The optical module cages may also host copper interfaces (e.g., twisted pair, coax (coaxial), twinax (twinaxial), or other metallic cable). For example, standard CFP or SFP optical cages may support socket compatible metallic interface modules. Thus, the term "optical module" as used herein may refer to any interface module (e.g., optical or copper) inserted into the optical cage (or other suitable structure).

In one example, ten optical fiber interfaces operable to transmit data at 40-100 Gb/s each are connected to the interface module and contained within the volumetric, power, and thermal footprint of the CPU socket. This would provide up to 1 Tb/s bandwidth per each of the interface modules on a quad-socket server with RoCE acceleration and local routing capabilities.

It is to be understood that the physical structure shown in FIG. 4 and described above is only an example and different components, connections, arrangements, link physical layers, or data rates may be used, without departing from the scope of the embodiments.

Figure 5:
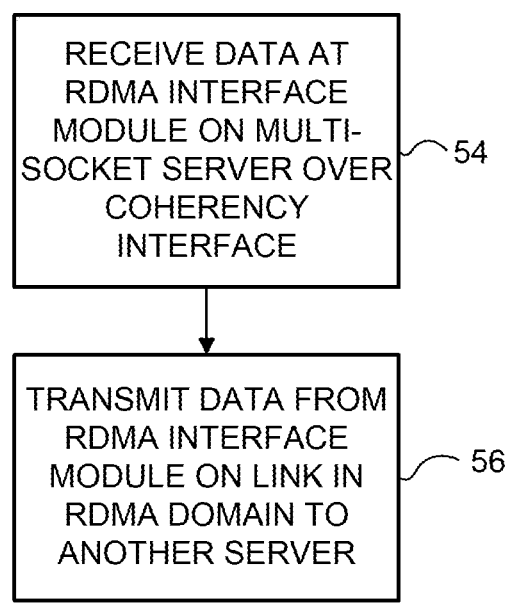
FIG. 5 is a flowchart illustrating an overview of a process for transferring data between the multi-socket servers, in accordance with one embodiment.

FIG. 5 is a flowchart illustrating an overview of a process for transferring data between multi-socket servers, in accordance with one embodiment. As previously described, the multi-socket server comprises at least one RDMA interface module and at least one processor interconnected through an inter-socket coherency interface. At step 54, data is received at the interface module on the multi-socket motherboard over the coherency interface. The data is transmitted from the interface module on an RDMA link (e.g., RoCEv2 link) to another server in an RDMA domain (step 56). Data is also received on the RDMA link and transmitted to the coherency interface.

It is to be understood that the process shown in FIG. 5 and described above is only an example and that steps may be added, combined, or modified, without departing from the scope of the embodiments.

As can be observed from the foregoing, the RDMA interface module described herein provides numerous advantages. For example, in one or more embodiments, very high performance RoCE interfaces may be directly integrated onto coherency buses. Once a multi-socket server is equipped with at least one RDMA interface module, a flexible SDN data center is created that the network can reconfigure for a myriad of capabilities. Operations such as joining applications, forming VNFs (Virtual Network Functions), and establishing service function chains across disparate compute and storage resources become much more efficient and cost effective. Demanding applications such as distributed analytics may determine the optimal configuration of compute, storage, and RDMA networking ports for each node in a network, and these configurations may be modified in the field by simply swapping the modules in each standard server socket. The embodiments described herein may also be used to retrofit legacy multi-socket server motherboards, thereby allowing generic servers to be equipped with multiple RoCE interfaces with performance far superior to PCIe connected host interfaces. In one or more embodiments, various combinations of processor, memory, and coherent RoCE inter-server interfaces may be custom configured onto a standard multi-socket server to meet specific needs of each server's application load.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. An apparatus comprising:
   a multi-socket motherboard comprising a plurality of sockets;
   a processor connected to a first socket of said plurality of sockets on the multi-socket motherboard;
   an RDMA (Remote Direct Memory Access) interface module connected to a second socket of said plurality of sockets on the multi-socket motherboard and in communication with the processor over an inter-socket coherency interface; and
   an inter-server port, wherein the inter-socket coherency interface is in communication with the inter-server port through the RDMA interface module;
   wherein the RDMA interface module connected to said second socket on the multi-socket motherboard provides an inter-server interface between servers operating as a high speed RDMA host channel adapter in an RDMA domain and wherein the servers comprise SDN (Software Defined Networking) servers; and
   wherein the multi-socket motherboard comprises at least two RDMA interface modules and at least one of the RDMA interface modules is reconfigurable to handle offloading of tasks comprising running network analytics under certain load conditions.

2. The apparatus of claim 1 wherein the inter-server interface comprises an RoCE (RDMA over Converged Ethernet) interface and the RDMA interface module provides a plurality of fast RoCE links.

3. The apparatus of claim 1 wherein the coherency interface comprises a QPI (QuickPath Interconnect) or UPI (UltraPath Interconnect) bus.

4. The apparatus of claim 1 further comprising a storage module connected to a third socket of the multi-socket motherboard, the storage module comprising a plurality of nonvolatile memory cards providing mass storage to the apparatus.

5. The apparatus of claim 1 further comprising RDMA interface modules connected to a third socket and a fourth socket of the multi-socket motherboard.

6. The apparatus of claim 1 further comprising processors connected to a third socket and a fourth socket of the multi-socket motherboard.

7. The apparatus of claim 1 wherein said first and second sockets of the multi-socket motherboard are configured such that the processor and the RDMA interface module may be exchanged between said first socket and said second socket.

8. The apparatus of claim 1 wherein the RDMA interface module comprises a router and RoCE (RDMA over Converged Ethernet) protocol engine in communication with a plurality of interfaces.

9. The apparatus of claim 1 wherein the RDMA interface module comprises an integrated circuit package connected to said second socket and in communication with a plurality of ports through an interposer.

10. A server comprising:
    a multi-socket motherboard comprising a plurality of sockets;
    a processor connected to a first socket of said plurality of sockets on the multi-socket motherboard;
    an RDMA (Remote Direct Memory Access) interface module connected to a second socket of said plurality of sockets on the multi-socket motherboard and in communication with the processor over an inter-socket coherency interface;

an inter-server port; and a plurality of optical modules in communication with the RDMA interface module to provide interfaces for communication with a plurality of severs in an RDMA domain with the server;

wherein the inter-socket coherency interface is in communication with the inter-server port through the RDMA interface module and comprises inter-chip coherency links in a mesh between said plurality of sockets;

wherein another RDMA interface module is connected to a third socket of said plurality of sockets; and wherein at least one of the RDMA interface modules is reconfigurable to handle offloading of tasks comprising running network analytics under certain load conditions.

11. The server of claim 10 wherein the RDMA interface module provides an RoCE (RDMA over Converged Ethernet) interface and the RDMA interface module provides a plurality of fast RoCE links.

12. The server of claim 10 wherein the server comprises an SDN (Software Defined Networking) server.

13. The server of claim 10 further comprising a storage module disposed on a third socket of the multi-socket motherboard, the storage module comprising a plurality of nonvolatile memory cards providing mass storage to the server.

14. The server of claim 13 wherein the multi-socket motherboard comprises a quad-socket motherboard and the motherboard is configurable such that each of said sockets is configured for receiving the processor, the RDMA interface module, or the storage module.

15. The server of claim 10 wherein the RDMA interface module comprises a router and RoCE (RDMA over Converged Ethernet) protocol engine in communication with said plurality of optical modules.

16. The server of claim 10 wherein the multi-socket motherboard is installed on a legacy server and the RDMA interface module replaces a CPU (Central Processing Unit) chip and heatsink that was previously removed from said second socket.

17. A method comprising:

receiving data at an RDMA (Remote Direct Memory Access) interface module mounted in a socket on a multi-socket motherboard over a coherency interface; and transmitting said data from the RDMA interface module on an RDMA link to a server in an RDMA domain;

wherein the multi-socket motherboard comprises at least one processor connected to a socket and in communication with the RDMA interface module over the coherency interface and wherein the coherency interface is in direct communication with the RDMA link through the RDMA interface module and comprises inter-chip coherency links in a mesh between said plurality of sockets;

wherein the RDMA interface module provides an inter-server interface between servers operating as a high speed RDMA host channel adapter in an RDMA domain and wherein the servers comprise SDN (Software Defined Networking) servers; and wherein the multi-socket motherboard comprises at least two RDMA interface modules and at least one of the RDMA interface modules is reconfigurable to handle offloading of tasks comprising running network analytics under certain load conditions.

18. The method of claim 17 wherein the RDMA link comprises an RoCE (RDMA over Converged Ethernet) link and the RDMA interface module provides a plurality of fast RoCE links.

19. The method of claim 17 further comprising receiving data on the RDMA link and transmitting said data received on the RDMA link directly to the coherency interface.

20. The method of claim 17 wherein the multi-socket motherboard is configurable such that all sockets of the motherboard are configured for receiving the processor, the RDMA interface module, or a storage module.

* * * * *